(12) United States Patent
Berger et al.

(10) Patent No.: US 9,862,427 B2
(45) Date of Patent: Jan. 9, 2018

(54) UNDERBODY OF A MOTOR VEHICLE

(71) Applicant: Dr. Ing. h.c. F. Porsche Aktiengesellschaft, Stuttgart (DE)

(72) Inventors: Dennis Berger, Bietigheim-Bissingen (DE); Michael Werner, Besigheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/063,863

(22) Filed: Mar. 8, 2016

(65) Prior Publication Data

US 2016/0272246 A1    Sep. 22, 2016

(30) Foreign Application Priority Data

Mar. 17, 2015    (DE) .......................... 10 2015 103 902

(51) Int. Cl.

| B60R 16/04 | (2006.01) |
|---|---|
| B62D 29/00 | (2006.01) |
| B62D 25/20 | (2006.01) |
| B60K 1/04 | (2006.01) |
| H01M 2/10 | (2006.01) |
| B60K 1/00 | (2006.01) |

(52) U.S. Cl.
CPC .............. B62D 29/005 (2013.01); B60K 1/04 (2013.01); B62D 25/20 (2013.01); H01M 2/1094 (2013.01); B60K 2001/005 (2013.01); B60K 2001/0438 (2013.01); H01M 2220/20 (2013.01)

(58) Field of Classification Search
CPC .... B62D 29/005; B62D 29/00; B62D 29/001; B62D 29/041; B62D 25/20; B62D 21/00; B62D 21/15; B62D 21/155; B62D 1/00; B62D 1/04; H01M 2/1094; H01M 2/10; H01M 2/1016; H01M 2220/20
See application file for complete search history.

(56) References Cited

U.S. PATENT DOCUMENTS

| 5,905,225 A * | 5/1999 | Joynt ........................ B63B 3/10 89/36.02 |
|---|---|---|
| 6,040,080 A * | 3/2000 | Minami ................... B60K 1/04 429/100 |
| 7,431,360 B1 * | 10/2008 | Bielak .................. A01K 23/005 294/1.5 |
| 8,286,743 B2 * | 10/2012 | Rawlinson .............. F41H 7/042 180/68.5 |
| 8,393,427 B2 * | 3/2013 | Rawlinson .............. F41H 7/042 180/68.5 |

(Continued)

FOREIGN PATENT DOCUMENTS

| DE | 102013206086 A1 | 10/2014 |
|---|---|---|
| DE | 102013106080 A1 | 12/2014 |
| WO | 2013/156732 | 10/2013 |

OTHER PUBLICATIONS

German Serach Report dated Apr. 26, 2016.

Primary Examiner — James M Dolak
(74) Attorney, Agent, or Firm — Gerald E. Hespos; Michael J. Porco; Matthew T. Hespos

(57) ABSTRACT

An underbody of a motor vehicle has a base plate (3) and an impact protector (6) connected a lower side of the base plate (3). The impact protector (6) is a material composite composed of metal and fiber composite material.

12 Claims, 2 Drawing Sheets

(56) References Cited

U.S. PATENT DOCUMENTS

| | | | |
|---|---|---|---|
| 8,833,499 B2* | 9/2014 | Rawlinson | F41H 7/042 |
| | | | 180/68.5 |
| 8,875,828 B2* | 11/2014 | Rawlinson | B60K 1/04 |
| | | | 180/68.5 |
| 9,045,030 B2* | 6/2015 | Rawlinson | B60K 1/04 |
| 9,052,168 B1* | 6/2015 | Rawlinson | F41H 7/042 |
| 9,054,402 B1* | 6/2015 | Rawlinson | F41H 7/042 |
| 9,222,260 B1* | 12/2015 | Hao | E04C 2/32 |
| 9,331,321 B2* | 5/2016 | Berger | H01M 2/1094 |
| 9,358,869 B2* | 6/2016 | Le Jaouen | B60K 6/40 |
| 9,540,055 B2* | 1/2017 | Berger | B60L 11/1874 |
| 9,666,845 B2* | 5/2017 | Hayashida | H01M 2/1094 |
| 9,673,432 B2* | 6/2017 | Tian | A63C 17/26 |
| 9,673,489 B2* | 6/2017 | Lee | H01M 2/0267 |
| 9,676,424 B2* | 6/2017 | Ito | B60K 1/04 |
| 9,682,535 B2* | 6/2017 | Komori | B62D 29/005 |
| 9,718,340 B2* | 8/2017 | Berger | B60K 1/00 |
| 2009/0295195 A1 | 12/2009 | Pietroni | |
| 2012/0103714 A1* | 5/2012 | Choi | B60K 1/04 |
| | | | 180/68.5 |
| 2012/0160088 A1 | 6/2012 | Rawlinson | |
| 2014/0302279 A1 | 10/2014 | Pfaffelhuber | |
| 2015/0075890 A1 | 3/2015 | Le Jaouen et al. | |
| 2015/0360550 A1* | 12/2015 | Berger | B60K 1/04 |
| | | | 180/68.4 |

\* cited by examiner

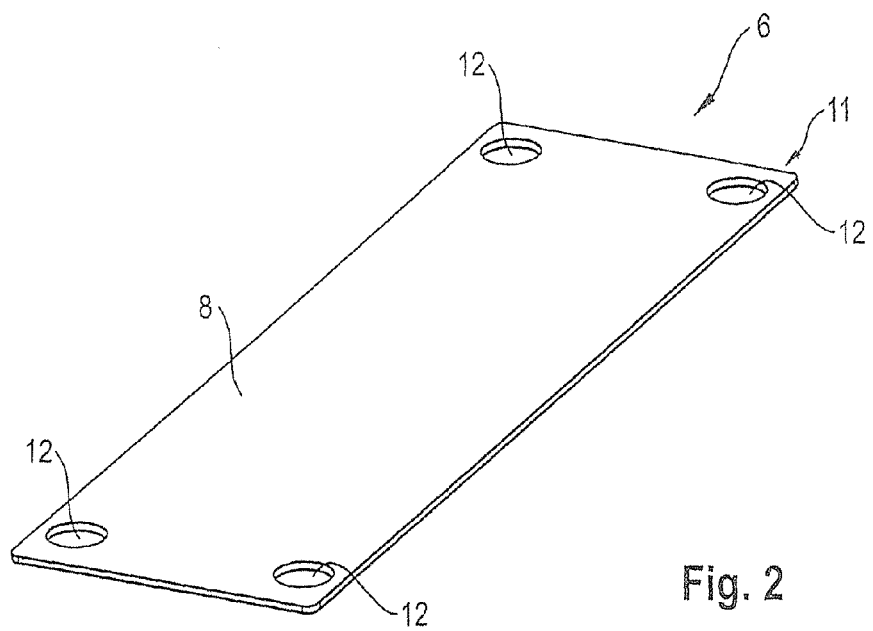
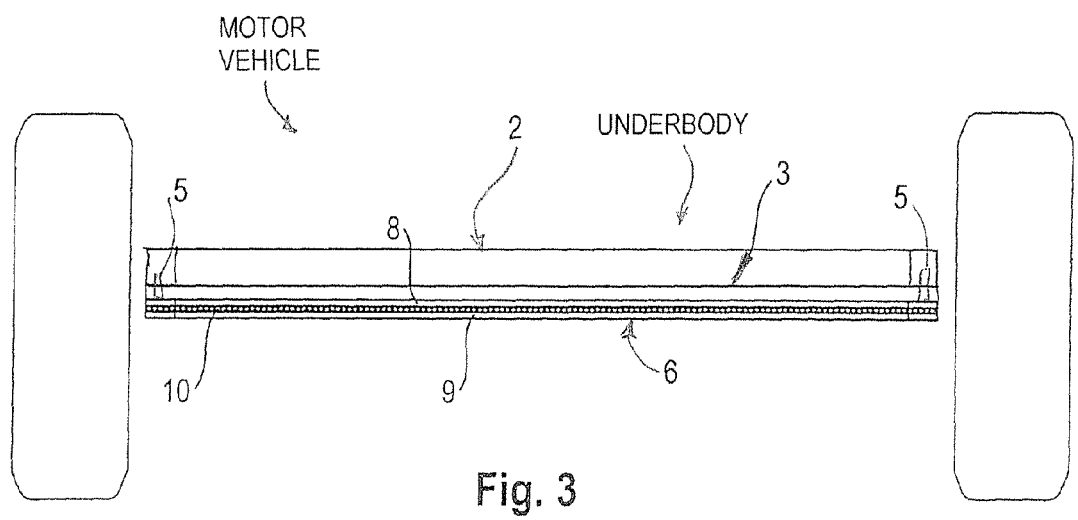

UNDERBODY OF A MOTOR VEHICLE

CROSS REFERENCE TO RELATED APPLICATION

This application claims priority under 35 USC 119 to German Patent Appl. No. 10 2015 103 902.8 filed on Mar. 17, 2015, the entire disclosure of which is incorporated herein by reference.

BACKGROUND

1. Field of the Invention

The invention relates to an underbody of a motor vehicle with a base plate and an impact protector connected to a lower side of the base plate.

2. Description of the Related Art

Motor vehicles typically use continuous, solid aluminum base plates as impact protection toward the road surface to protect against objects, bollards etc. striking against the motor vehicles. The solid aluminum base plates also may be part of an underbody traction battery of a hybrid vehicle or electric vehicle.

US 2009/0295195 A1 describes an underbody of a motor vehicle with a front region produced from an aramid-based fiber composite material, such as Kevlar fibers.

US 2012/0160088 A1 discloses an impact protector of an underbody battery, wherein the impact protector is arranged at a distance from the latter.

US 2012/0103714 A1 and WO 2013/156732 A1 describe the use of laminated fibers for protecting an underbody battery.

It is an object of the invention to provide a particularly effective protection measure for the underbody of a motor vehicle.

SUMMARY

The invention relates to an underbody of a motor vehicle. The underbody has a base plate and an impact protector connected to a lower side of the base plate. The impact protector is a material composite composed of metal and fiber composite material.

The metal is preferably a highly elastic aluminum or titanium.

The fiber composite material may be an aramid fiber and/or an aramid fabric.

The impact protector in the form of a material composite composed of metal and fiber composite material makes it possible to ensure the operation of the impact protector in a very confined space. More particularly, a thickness of the impact protector may be only 2 to 4 mm, in particular only 3 mm. The impact protector accordingly is an impact protection layer.

An intelligent material composite containing metal and fiber composite material is used as the impact protector. The fiber composite material also has the function of providing thermal insulation toward the hot roadway surface.

The impact protector may be formed by a multiplicity of individual plates that lie on one another, cover the base plate and are connected to the base plate. Alternatively, the impact protector may be formed using a single entire plate that covers the base plate and is connected to the base plate.

The individual plates or the entire plate may be formed from two metal layers with the fiber composite material arranged therebetween. The impact protector therefore may be composed of three individual layers that form the material composite.

The respective individual plates or entire plate may be laminated directly onto the base plate. The protective layer therefore may be bonded adhesively from below against the base plate as a laminate. In principle, however, it would also be possible to connect the respective individual plates or the entire plate to the base plate by means of connecting elements. However, the outlay on installation is significantly higher in this case.

The impact protector may be used for an underbody battery of a hybrid vehicle or electric vehicle. The base plate is therefore part of an underbody battery of a hybrid vehicle or electric vehicle. The underbody battery may be an underbody traction battery of the hybrid vehicle or electric vehicle. The base plate of the battery may be a metal plate, such as an aluminum plate. A cooling structure with cooling ducts may be integrated in the base plate, or the side thereof facing away from the impact protector. This cooling structure permits cooling the traction battery of the motor vehicle. The base plate that is designed as part of the battery may be screwed, adhesively bonded or welded to a structural frame of the underbody traction battery.

The base plate can be a customary base plate of the motor vehicle, to which an impact protector on the lower side of the base plate is connected. However, the base plate may be a base plate of a battery of a hybrid vehicle or electric vehicle. The battery may be arranged in the region of the underbody of the motor vehicle. The impact protector may be a material composite composed of metal and fiber composite material and sustainably prevents damage to the base plate of the battery and therefore damage to the battery as an important functional part of the vehicle.

Further features of the invention emerge from the independent claims, the attached drawing and the description of the preferred exemplary embodiments, which are reproduced in the drawing, without being restricted thereto.

BRIEF DESCRIPTION OF THE DRAWINGS

FIG. 2 shows an exemplary embodiment of an impact protector for use in an underbody of a motor vehicle, wherein the impact protector is designed as an individual plate, shown in a three-dimensional view.

FIG. 3 shows the individual plate according to FIG. 2 in a side view.

DETAILED DESCRIPTION

Figure 1:
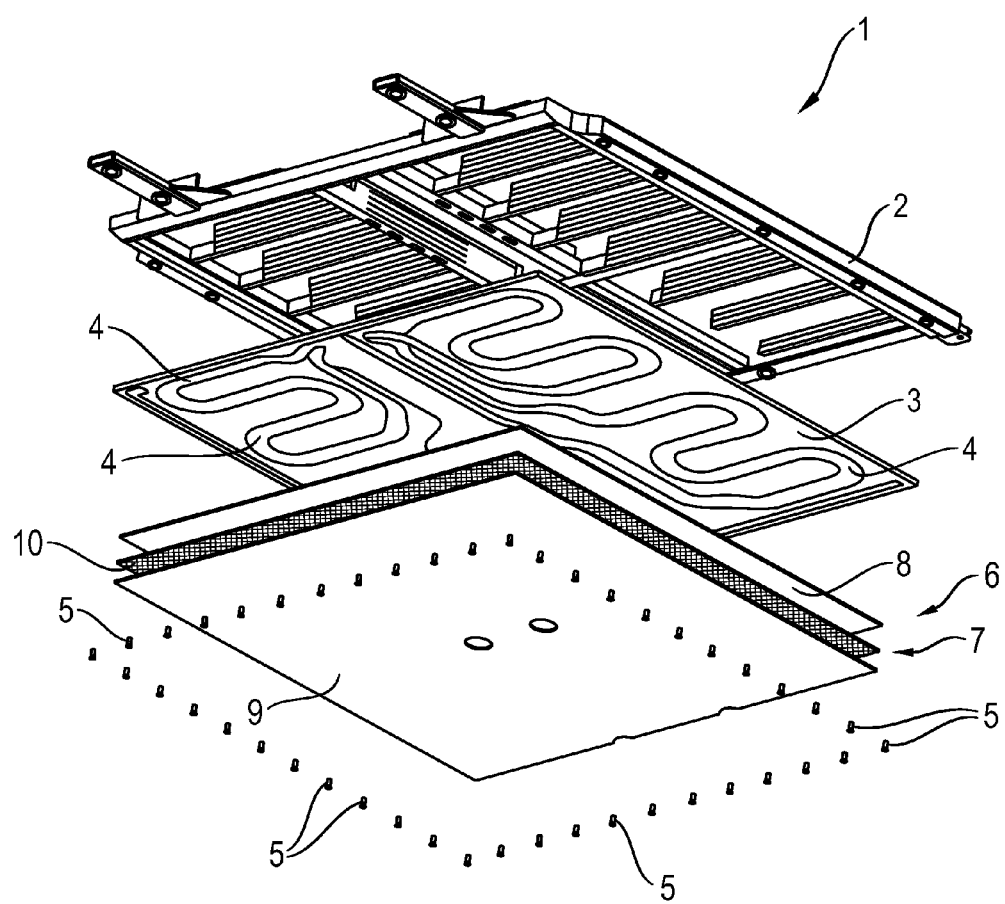
FIG. 1 shows an exploded illustration of a first exemplary embodiment of the underbody of a motor vehicle in the region of a traction battery, with an impact protector designed as an entire plate.

FIG. 1 shows the underbody of a motor vehicle in the region of an underbody traction battery 1 of a hybrid vehicle or electric vehicle. The underbody traction battery 1 is shown with regard to a structural frame 2 made from metal and a base plate 3 located below the structural frame 2. The base plate 3 is composed of aluminum and has cooling ducts 4 that are milled onto the upper side thereof and arranged in serpentine form. The base plate 3 is screwed to the upper structural frame 2 by a multiplicity of screws 5. In this arrangement of structural frame 2 and base plate 3, the underbody traction battery 1 can be cooled from below by means of cooling medium passing through the cooling ducts 4. The base plate 3 would customarily therefore have the lower surface thereof facing the street and would act as an impact protector toward the street surface to protect against objects, bollards etc. striking thereon.

To optimize the impact protection, an independent impact protector 6 is provided and is connected to the base plate 3. The impact protector 6 is a material composite composed of metal and fiber composite material. The impact protector 6 is designed as an entire plate 7 in a manner corresponding to the surface and design of the base plate 3, and completely covers the structural frame 2 of the underbody traction battery 1. Use therefore is made of a single entire plate 7 for covering the base plate 3. The entire plate 7 is formed from two metal layers 8, 9 and the fiber composite material 10 arranged therebetween. The dimensions of length and width of the metal layers 8, 9 and of the fiber composite material 10 are therefore identical. The metal layers 8, 9 and the fiber composite material 10 form a material composite, and thus constitute a unit prior to the installation of the base plate 3.

The respective metal layer 8, 9 is composed of a highly elastic aluminum or titanium. The fiber composite material 10 arranged between the metal layers 8, 9 is an aramid fiber or an aramid fabric. It is entirely also possible to use a combination of aramid fiber and aramid fabric.

The impact protector 6 is designed as an impact protection layer and therefore has a relatively small thickness, preferably a thickness of 3 mm.

The impact protector 6 is laminated from below onto the base plate 3 of the underbody traction battery 1 as a laminate. Separate fastening means do not need to be used. In particular, it is not necessary to screw the impact protector 6 to the base plate 3. The impact protector 6 therefore is laminated directly onto the assembled unit of structural frame 2 and base plate 3. The impact protector 6 permits a very high degree of strength without a screw connection. Accordingly, the overall height of the underbody traction battery 1 is only slightly increased by the impact protector 6.

FIGS. 2 and 3 illustrate an impact protector 6 formed from the two metal layers 8, 9 and the fiber composite material 10 located therebetween. However, this impact protector 6 is not an entire plate 7, but rather an individual plate 11. The individual plate 11 has a rectangular shape, in the same manner as the impact protector 6, but is provided with holes 12 in the region of the corners for the passage of connecting elements, such as screws. Plural individual plates 11 are positioned in a close-packed manner and are connected to the base plate to cover a base plate of a motor vehicle, and need not be limited for protection of a battery of a vehicle. The individual plates 11 therefore are fit on the base plate in the manner of tiles.

LIST OF REFERENCE NUMBERS

1 underbody traction battery
2 structural frame
3 base plate
4 cooling duct
5 screw
6 impact protector
7 entire plate
8 metal layer
9 metal layer
10 fiber composite material
11 individual plate
12 hole

What is claimed is:

1. An underbody of a motor vehicle, comprising: a structural frame; a base plate secured to the structural frame and having a lower surface; and an impact protector connected to the lower surface of the base plate, the impact protector being a composite material composed of upper and lower metal layers and a fiber composite material layer disposed between the upper and lower metal layers and wherein the fiber composite material layer is in face-to-face contact with the upper and lower metal layers, the upper metal layer having an upper surface facing away from the fiber composite material layer, the upper surface of the upper metal layer being connected to the lower surface of the baseplate; and wherein the base plate is part of an underbody traction battery of a hybrid vehicle or electric vehicle.

2. The underbody of claim 1, wherein the metal layers are a highly elastic aluminum or titanium.

3. The underbody of claim 1, wherein the fiber composite material layer is an aramid fiber or an aramid fabric.

4. The underbody of claim 1, wherein the impact protector is an impact protection layer having a thickness of 2to 4mm.

5. The underbody of claim 1, wherein the impact protector is formed by a single entire plate.

6. The underbody of claim 5, wherein the entire plate is laminated directly onto the base plate.

7. The underbody of claim 1, wherein the base plate is an aluminum plate.

8. The underbody of claim 1, further comprising a cooling structure with cooling ducts integrated in the base plate on a side of the base plate facing away from the impact protector.

9. The underbody of claim 1, wherein the base plate is screwed, adhesively bonded or welded to a structural frame of the underbody battery.

10. The underbody of claim 1, wherein the impact protector is formed by a multiplicity of individual plates.

11. The underbody of claim 10, wherein each of the respective individual plates is formed from two metal layers and the fiber composite material layer arranged therebetween.

12. The underbody of claim 10, wherein each of the respective individual plates is laminated directly onto the base plate.

* * * * *